United States Patent
Pasala et al.

(10) Patent No.: US 10,223,246 B2
(45) Date of Patent: Mar. 5, 2019

(54) SYSTEM AND METHOD FOR FUNCTIONAL TEST CASE GENERATION OF END-TO-END BUSINESS PROCESS MODELS

(71) Applicant: Infosys Limited, Bangalore (IN)

(72) Inventors: Anjaneyulu Pasala, Bangalore (IN); Sharal Nisha Dsouza, Mangalore (IN)

(73) Assignee: Infosys Limited, Bangalore (IN)

( * ) Notice: Subject to any disclaimer, the term of this patent is extended or adjusted under 35 U.S.C. 154(b) by 161 days.

(21) Appl. No.: 13/946,249

(22) Filed: Jul. 19, 2013

(65) Prior Publication Data

US 2014/0165043 A1 Jun. 12, 2014

(30) Foreign Application Priority Data

Jul. 31, 2012 (IN) .......................... 3123/CHE/2012

(51) Int. Cl.
- *G06F 8/10* (2018.01)
- *G06F 8/34* (2018.01)
- *G06F 8/35* (2018.01)
- *G06F 11/36* (2006.01)
- *G06Q 10/06* (2012.01)

(52) U.S. Cl.
CPC ............ *G06F 11/3684* (2013.01); *G06F 8/35* (2013.01); *G06Q 10/067* (2013.01); *G06Q 10/0633* (2013.01); *G06F 8/10* (2013.01); *G06F 8/34* (2013.01)

(58) Field of Classification Search
CPC ......................... G06F 8/10; G06F 8/35; G06F 11/3668–11/3692; G06Q 10/0633; G06Q 10/067

See application file for complete search history.

(56) References Cited

U.S. PATENT DOCUMENTS 5,500,941 A * 3/1996 Gil ...................... G06F 11/3684
714/38.1
5,615,333 A * 3/1997 Juettner ................ G06F 9/4428
714/38.13

(Continued)

OTHER PUBLICATIONS

Georg Kosters el al., "Validation and Verification of Use Cases and Class Models", ISOWARE, Sep. 1999, <http://citeseerx.ist.psu.edu/viewdoc/download?doi=10.1.1.26.5633&rep=rep1&type=pdf>, pp. 1-10.*

(Continued)

*Primary Examiner* — Geoffrey R St Leger

(74) *Attorney, Agent, or Firm* — LeClairRyan PLLC

(57) ABSTRACT

A system, medium and method for testing an end-to-end software application is disclosed. A structured business process model (BPM) representative of a set of business requirements for an end-to-end software application to be tested is first generated. The generated structured BPM is validated in association with one or more validation rules. A functional flow layout representative of a node structure embodying all possible scenarios to be handled by the software application is then generated. A plurality of functional flow paths is identified from the functional flow layout, wherein each functional flow path is associated with one or more corresponding scenarios of the possible scenarios. One or more test cases for each identified functional flow path is then generated.

24 Claims, 14 Drawing Sheets

(56) References Cited

U.S. PATENT DOCUMENTS

| | | | | |
|---|---|---|---|---|
| 5,629,878 | A * | 5/1997 | Kobrosly | G05B 13/028 702/120 |
| 5,805,795 | A * | 9/1998 | Whitten | G06F 11/3672 714/32 |
| 6,006,028 | A * | 12/1999 | Aharon | G06F 11/3684 703/21 |
| 6,173,440 | B1 * | 1/2001 | Darty | 717/130 |
| 6,460,147 | B1 * | 10/2002 | Cox | 714/38.12 |
| 7,925,659 | B2 | 4/2011 | Wefers | |
| 9,003,368 | B2 * | 4/2015 | Kim | G06N 5/04 717/124 |
| 2003/0070119 | A1 * | 4/2003 | Dallin | G06F 11/3684 714/38.14 |
| 2003/0093716 | A1 * | 5/2003 | Farchi et al. | 714/34 |
| 2004/0088677 | A1 * | 5/2004 | Williams | G06F 11/3684 717/104 |
| 2005/0229044 | A1 * | 10/2005 | Ball | 714/38 |
| 2006/0010428 | A1 * | 1/2006 | Rushby et al. | 717/124 |
| 2006/0248405 | A1 * | 11/2006 | Ponczak et al. | 714/38 |
| 2006/0253839 | A1 * | 11/2006 | Avritzer | G06F 11/3684 717/124 |
| 2007/0089091 | A1 | 4/2007 | Larab et al. | |
| 2008/0184206 | A1 * | 7/2008 | Vikutan | G06F 11/3688 717/127 |
| 2008/0250279 | A1 * | 10/2008 | Grise et al. | 714/724 |
| 2010/0180256 | A1 | 7/2010 | Gorthi et al. | |
| 2011/0016451 | A1 * | 1/2011 | Gorthi et al. | 717/124 |
| 2011/0016452 | A1 * | 1/2011 | Gorthi et al. | 717/124 |
| 2011/0131217 | A1 * | 6/2011 | Iwasaki et al. | 707/752 |
| 2012/0089869 | A1 * | 4/2012 | Cohen | 714/26 |
| 2012/0101977 | A1 * | 4/2012 | Kim | G06F 11/3684 706/60 |
| 2012/0131309 | A1 * | 5/2012 | Johnson et al. | 712/41 |
| 2012/0216176 | A1 * | 8/2012 | Gaikwad et al. | 717/124 |
| 2012/0222013 | A1 * | 8/2012 | Zheng et al. | 717/125 |

OTHER PUBLICATIONS

Yuan, Q., et al., A Model Driven Approach Toward Business Process Test Case Generation, 10th International Symposium on Web Site Evolution, 2008, pp. 41-44, [retrieved on Oct. 3, 2018], Retrieved from the Internet: <URL:http://ieeexplore.ieee.org/>.*

Sharma, N., et al., Generation of Character Test Input Data using GA for Functional Testing, 19th Asia-Pacific Software Engineering Conference, 2012, pp. 87-94, [retrieved on Oct. 3, 2018], Retrieved from the Internet: <URL:http://ieeexplore.ieee.org/>.*

* cited by examiner

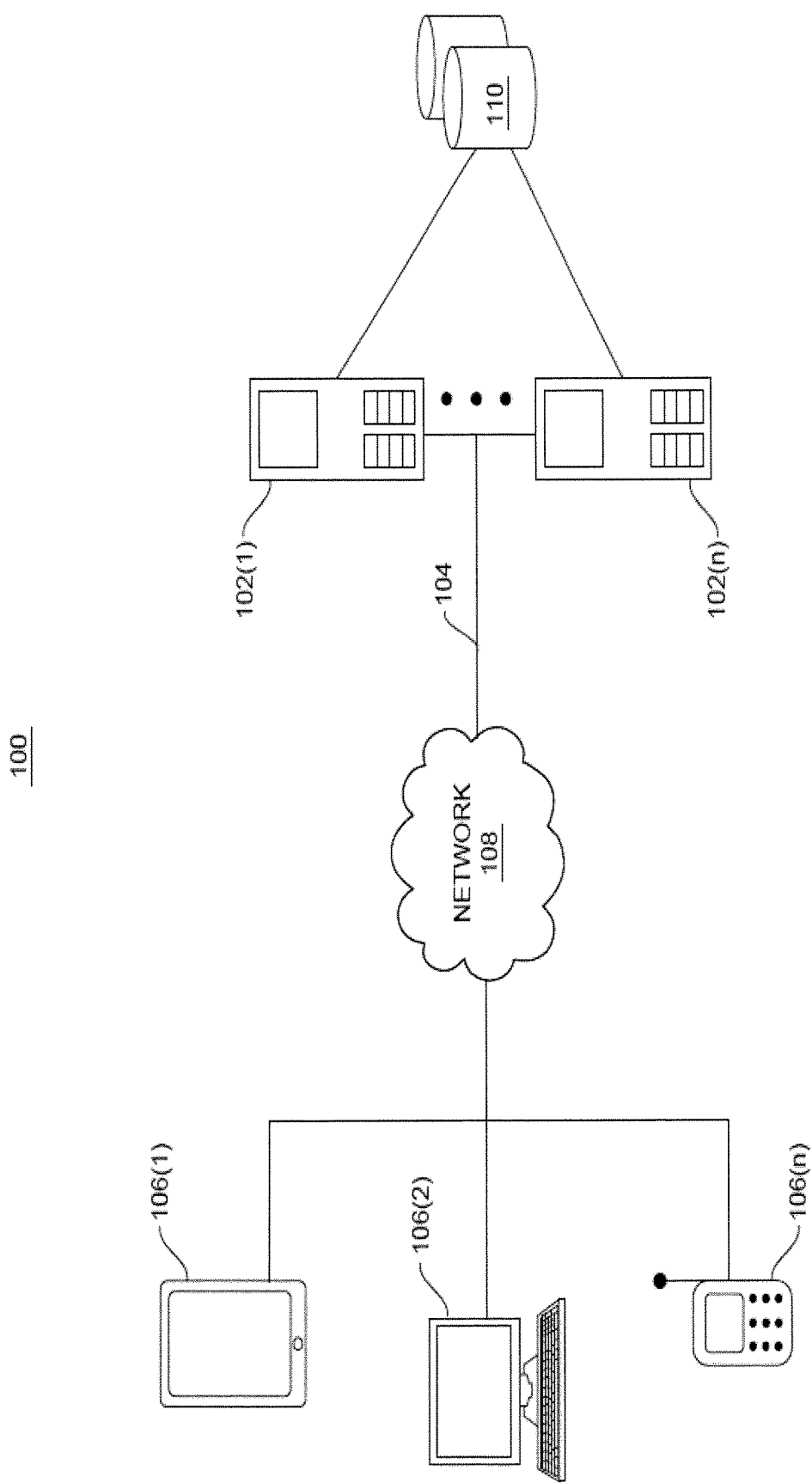

| Role | Application Sub-process | Workflow Path No: | Activities | Test Case # | Criticality | Test Step # | Test Step Description | Conditions | Expected Output |
|---|---|---|---|---|---|---|---|---|---|
| Customer | | WF_Path No: 1 | Register for new account | 1 | Low | 1 | Please enter the account number | All in one card?=No | Condition not satisfied. Please re-enter account number. |
| | | | | 1 | Low | 2 | Please enter the account number | All in one card?=Yes | Please enter the password. |
| | | | | 2 | Low | 1 | Please enter the account number | Max attempts reached?=No | Please select the document type. |
| | | | | 2 | Low | 2 | Accept the password | | Enter Personal ID |
| | | | | 2 | Low | 3 | User selects document type from drop down | Does entered Personal ID consist of 15 or 18 digits?=Yes | Select gender from drop-down. |
| | | | | 3 | Low | 1 | Please enter the account number | | Enter Personal ID |
| | | | | 3 | Low | 2 | Accept the password | Does entered Personal ID consist of 15 or 18 digits?=Yes | Select gender from drop-down. |
| | | | | 3 | Low | 3 | User selects document type from drop down. | | Enter the coupon ID |
| | | | | 4 | Low | 1 | Please enter the account number | Does entered Personal ID consist of 15 or 18 digits?=Yes | Select gender from drop-down. |
| System | | WF_Path No: 1 | Thanks for registering | | | | | | Enter the coupon ID |
| Customer | | WF_Path No: 2 | Register for new account | 1 | Low | 1 | Please enter the account number | Does entered Personal ID consist of 15 or 18 digits?=Yes | Coupon ID can have only 18 digits |
| | | | | 1 | Low | 2 | Please enter the account number | All in one card?=Yes | Please enter the password. |

FIG. 5

SYSTEM AND METHOD FOR FUNCTIONAL TEST CASE GENERATION OF END-TO-END BUSINESS PROCESS MODELS

This application claims the benefit of Indian Patent Application Filing No. 3123/CHE/2012, filed, Jul. 31, 2012 which is hereby incorporated by reference in its entirety.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to a system and method for functional test case generation of business process models that represent business requirements specifications of end to end software applications.

BACKGROUND

Testing of software applications is a time consuming activity which requires a great amount of planning and resources. This testing includes two phases: a design phase and an execution phase. In the design phase, test cases are created from software requirements. Though there exists techniques and tools to generate test cases automatically, it is still largely a manual activity in the industry. As the complexity and size of software applications grows, generation and maintenance of test cases becomes complex and unmanageable.

End-to-end application testing involves the testing the functionalities of all of the applications using manually generated test cases. Considering that testing the entire application system, end-to-end, can require nearly tens of thousands of test cases, manually creating all the test cases and evaluating them against the application system is an extremely burdensome task.

What is needed is a method, system and computer program product for functional test case generation of business process models of an end to end software application.

SUMMARY

In an aspect, a method for testing an end-to-end software application having a plurality of functionalities is disclosed. The method comprises generating, using a processor of a computing device, a structured business process model (BPM) representative of a set of business requirements for an end-to-end software application to be tested. The structured BPM includes a plurality flow objects and linking objects. The method includes validating, using the processor, the generated structured BPM in association with one or more validation rules. The method includes generating, using the processor, a functional flow layout representative of a node structure embodying all possible scenarios to be handled by the software application. The method includes identifying, using the processor, a plurality of functional flow paths from the functional flow layout, wherein each functional flow path is associated with one or more corresponding scenarios of the possible scenarios. The method includes generating, using the processor, one or more test cases for each identified functional flow path.

In an aspect, a non-transitory machine readable medium having stored thereon instructions for testing an end-to-end software application having a plurality of functionalities is disclosed. The medium comprises machine executable code which when executed by at least one processor of a computing device, causes the processor to generate a structured business process model (BPM) representative of a set of business requirements for an end-to-end software application to be tested. The structured BPM includes a plurality flow objects and linking objects. The medium is configured to validate the generated structured BPM in association with one or more validation rules. The medium is configured to generate a functional flow layout representative of a node structure embodying all possible scenarios to be handled by the software application. The medium is configured to identify a plurality of functional flow paths from the functional flow layout, wherein each functional flow path is associated with one or more corresponding scenarios of the possible scenarios. The medium is configured to generate one or more test cases for each identified functional flow path.

In an aspect, a computing device configured to test an end-to-end software application having a plurality of functionalities is disclosed. The computing device comprises a memory having stored thereon code embodying machine executable programmable instructions; and a processor configured to execute the stored programming instructions in the memory. The instructions, which when executed by the processor, causes the processor to generate a structured business process model (BPM) representative of a set of business requirements for an end-to-end software application to be tested. The structured BPM includes a plurality flow objects and linking objects. The processor is configured to validate the generated structured BPM in association with one or more validation rules. The processor is configured to generate a functional flow layout representative of a node structure embodying all possible scenarios to be handled by the software application. The processor identifies a plurality of functional flow paths from the functional flow layout, wherein each functional flow path is associated with one or more corresponding scenarios of the possible scenarios. The processor generates one or more test cases for each identified functional flow path.

In one or more aspects, information associated with at least the generated structured BPM is stored in a memory, wherein the stored information is mapped to an established test case profile for the end-to-end software application being tested.

In one or more aspects, the generated structured BPM is parsed to identify all elements included in the structured BPM. A node structure including a plurality of nodes is then created. Each identified element is then mapped to a corresponding location in the node structure utilizing at least attribute information associated with each identified element, wherein a unique ID-key value is assigned to each identified element that maps the identified element with its corresponding location in the node structure. One or more relationships between identified elements is identified with respect to the node structure.

In one or more aspects, when generating the one or more test cases, a role of a selected flow path of the structured BPM is identified. In this aspect, test conditions for the selected flow path are identified by analyzing branch elements to recognize required conditional information for the flow path. In this aspect, an expected outcome for each branch element is determined for each generated test case for the selected flow path, wherein the expected outcome is stored for a test case profile in a memory.

In one or more aspects, the one or more generated test cases are applied to a corresponding flow path in the end-to-end software application. An actual outcome from the flow path of the software application is compared to an expected outcome for the flow path. A report including at least the actual outcome and the expected outcome is generated, wherein the generated report is displayable on a computing device screen.

In one or more above aspects, a test case regression technique is performed prior to the validation. The technique includes determining if the structured BPM is an updated version of a previous version of a structured BPM. The Flow objects are extracted from the updated version of the structured BPM, whereby the extracted flow objects are compared with corresponding flow objects in the previous version. In this aspect, one or more flow objects in the updated version that have changed are identified with respect to the previous version. Affected flow paths of the changed flow objects are identified in the updated version, wherein the changed flow objects and identified affected flow paths to be validated.

In one or more above aspects, one possible scenario includes a sequence of executable activities to be performed by the software application. In one or more above aspects, one or more states and transitions associated with a sequence of executable activities to be performed by the software application.

BRIEF DESCRIPTION OF THE DRAWINGS

FIG. 1A illustrates an example system including a computing device implementing a testing module in accordance with an aspect of the present disclosure;

FIG. 5 illustrates an example display showing results produced by the testing module in accordance with an aspect of the present disclosure.

DETAILED DESCRIPTION

Figure 1B:
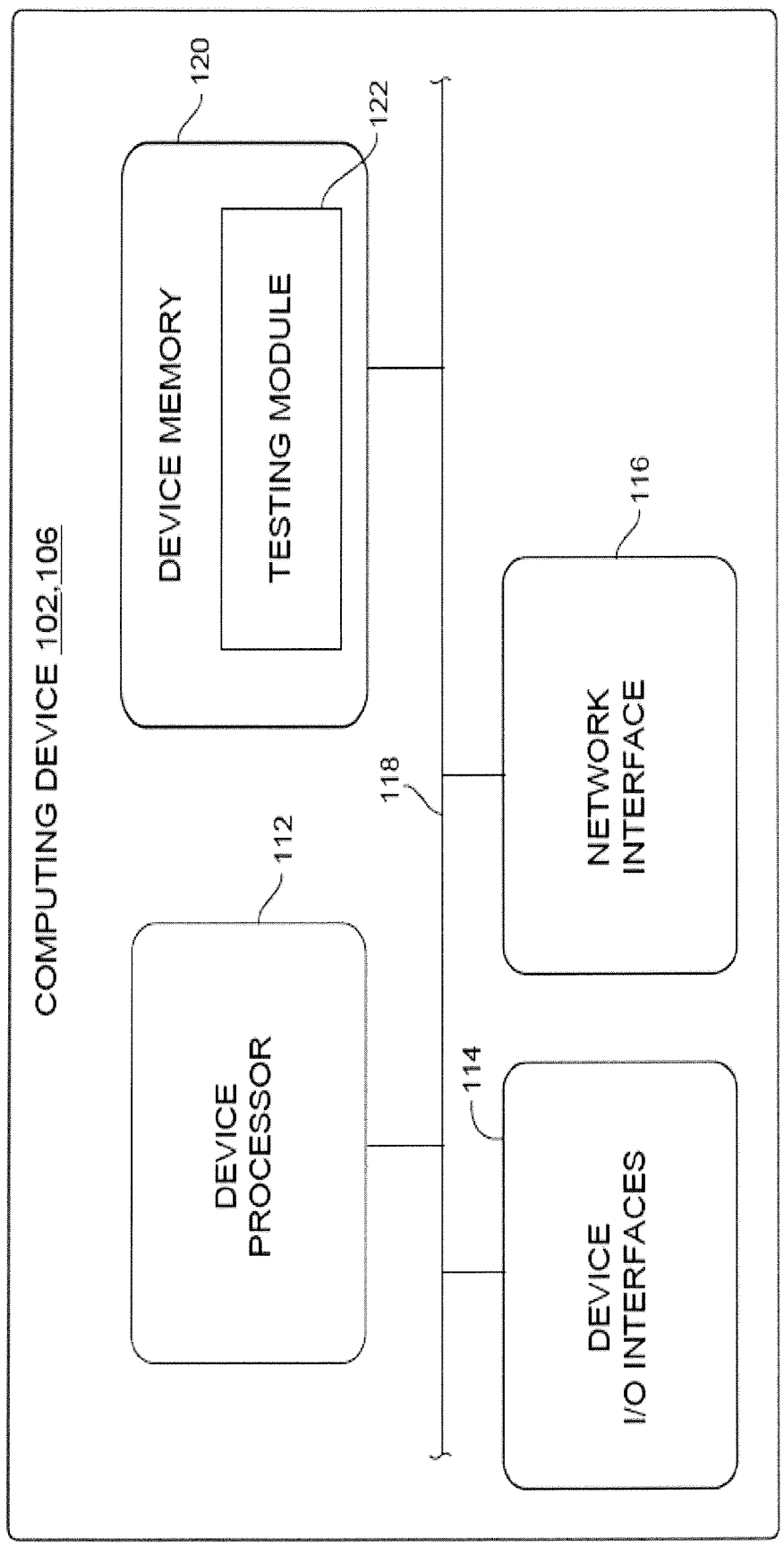
FIG. 1B illustrates a block diagram of a computing device in accordance with an aspect of the present disclosure.

FIG. 1A illustrates a diagram of an example system environment that implements and executes a comprehensive test case generation system and method for verifying functionalities of end-to-end applications and generating test cases for functionalities in accordance with an aspect of the present disclosure. In particular, the example system environment 100 includes a plurality of computing devices. It should be noted that the term "computing devices" can be referred to as encompassing one or more client devices, one or more physical and/or virtual servers, cloud computing devices and/or other components in the system 100.

The servers 102(1)-102(n) include but are not limited to application servers, database servers, computation farms, data centers, virtual machines, cloud computing devices, mail or web servers and the like. The network system 100 includes one or more client devices 106(1)-106(n), although the environment 100 could include other numbers and types of devices in other arrangements.

The servers 102(1)-102(n) are connected to a local area network (LAN) 104 and the client devices 106(1)-106(n) are connected to a wide area network 108. The servers 102(1)-102(n) comprise one or more computing devices or machines capable of operating one or more Web-based and/or non Web-based applications that may be accessed by other computing devices (e.g. client devices, other servers) via the network 108. One or more servers 102(1)-102(n) may be front end Web servers, application servers, and/or database servers. Such data includes, but is not limited to Web page(s), image(s) of physical objects, user account information, and any other objects and information. It should be noted that the servers 102(1)-102(n) may perform other tasks and provide other types of resources.

One or more servers 102 may comprise a cluster of a plurality of servers which are managed by a network traffic device such as a firewall, load balancer, web accelerator, gateway device, router, hub and the like. In an aspect, one or more servers 102(1)-102(n) may implement a version of Microsoft® IIS servers, RADIUS servers and/or Apache® servers, although other types of servers may be used and other types of applications may be available on servers 102(1)-102(n). It should be noted that although the client device and/or server may be referred to herein in the plural, it is contemplated that only one client device and/or one server may be considered without being limiting to the language used herein. It should be understood that the particular configuration of the system 100 shown in FIG. 1A are provided for exemplary purposes only and is thus not limiting.

Client devices 106(1)-106(n) comprise computing devices capable of connecting to other computing devices, such as the servers 102(1)-102(n). Such connections are performed over wired and/or wireless networks, such as network 108, to send and receive data, such as Web-based and/or non Web-based requests, receiving responses to requests and/or performing other tasks, in accordance with the novel processes described herein. Non-limiting and non-exhausting examples of such client devices 106(1)-106(n) include, but are not limited to, personal computers, mobile phones and/or smart phones, pagers, tablet devices, PDAs and the like. In an aspect, the client device 106 may be configured to run a Web browser or other software module that provides a user interface for human users to interact with and access a testing module, as will be described in more detail below. For example, the client device may include a locally stored mobile application which allows the user to request resources and/or information via the mobile application.

Network 108 comprises a publicly accessible network, such as the Internet, which handles communication between the client devices 106(1)-106(n) and the servers 102(1)-102(n). However, it is contemplated that the network 108 may comprise other types of private and/or public networks. Communications between the client devices 106(1)-106(n) and the servers 102(1)-102(n) preferably take place over the network 108 according to network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate computing devices may act as links within and between LANs, WANs and other networks to enable messages and other data to be sent and received between computing devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies.

As shown in FIG. 1A, the environment 100 may include one or more databases 110 coupled to the computing devices 102, 106 in which the databases 110 are configured to allow storage and access to data, files or otherwise information utilized or produced by the testing module 122. Databases are well known in the art, and details regarding databases 110 will not be described herein.

FIG. 1B illustrates a block diagram of a computing device in accordance with an aspect of the present disclosure. With regard to FIG. 1B, the computing device may be one or more of a plurality of servers 102 and/or one or more client device 106. The computing device 102, 106 includes one or more device processors 112, one or more device I/O interfaces 114, one or more network interfaces 116 and one or more device memories 120, all of which are coupled together by one or more buses 118. It should be noted that the computing device 102 could include other types and numbers of components.

Device processor 112 comprises one or more microprocessors configured to execute computer/machine readable and executable instructions stored in the respective local or remote device memory 120. Such instructions are executed by the processor 112 to perform one or more functions described below. It is understood that the processor 112 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 112 is programmed or configured to execute the process in accordance with the teachings as described and illustrated herein of the novel system and method described below.

Device I/O interfaces 114 comprise one or more user input and output device interface mechanisms. The interface may include a computer keyboard, mobile device keypad, touchpad, touchscreen, mouse, display device, and the corresponding physical ports and underlying supporting hardware and software to enable communications with other computing devices in the system 100. Such communications include, but are not limited to, accepting user data input and providing output information to a user, programming, accessing one or more memory devices and administering one or more functions to be executed by the corresponding device and the like.

Network interface 116 comprises one or more mechanisms that enable the client devices 106 and/or the servers 102 to engage in TCP/IP communications or other communications over the LAN 104 and network 108. However, it is contemplated that the network interface 116 may be constructed for use with other communication protocols and types of networks. Network interface 116 is sometimes referred to as a transceiver, transceiving device, or network interface card (NIC), which transmits and receives network data packets over one or more networks, such as LAN 104 and network 108.

In an example where the client device 106 and/or server 102 includes more than one device processor 112 (or a processor 112 has more than one core), each processor 112 (and/or core) may use the same single network interface 116 or a plurality of network interfaces 116 to communicate with other computing devices. Further, the network interface 116 may include one or more physical ports, such as Ethernet ports, to couple its respective device with other computing devices in the system 100. Moreover, the network interface 116 may include certain physical ports dedicated to receiving and/or transmitting certain types of network data, such as device management related data for configuring the respective device, and the like.

Bus 118 may comprise one or more internal device component communication buses, links, bridges and supporting components, such as bus controllers and/or arbiters. The bus enable the various components of the computing device such as the processor 112, device I/O interfaces 114, network interface 116, and device memory 120, to communicate with one another. However, it is contemplated that the bus may enable one or more components of its respective computing device to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the computing device which houses the bus.

Device memory 120 of the computing device 102,106 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 112. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

As shown in FIG. 1B, a testing module 122 is shown within the memory 120 and comprises computer readable/ machine executable instructions. It is contemplated that the testing module 122 may alternatively be housed in another memory external to the memory 120. Such stored instructions allow the processor 112 to perform actions, including implementing an operating system for controlling the general operation of the client device 106 and/or server 102 to perform one or more portions of the novel process described below. The testing module 122 is configured to cause the computing device 102, 106 to perform the test case generation method to verify the functionalities of all the applications in a business process model, as will be described in more detail below.

Figure 2A:
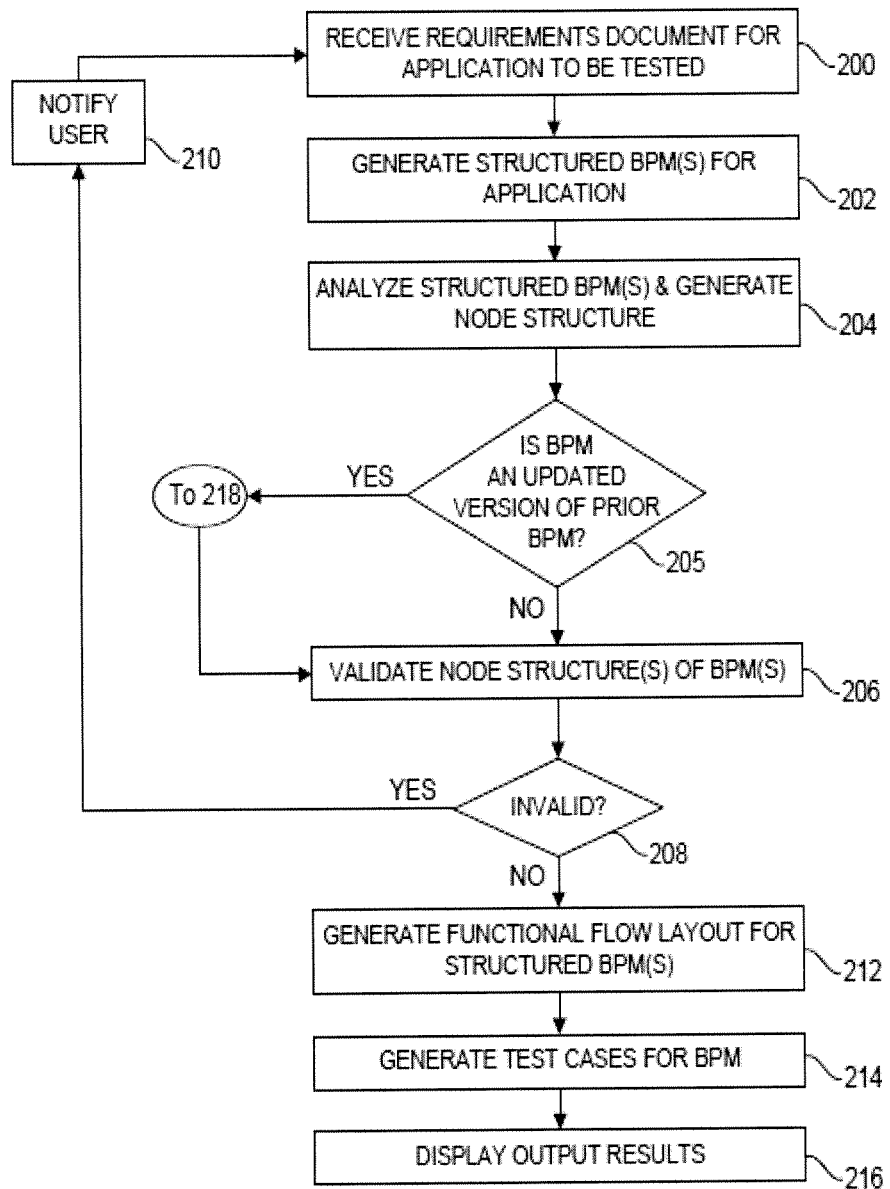
FIG. 2A illustrates a flowchart of a method for testing an end-to-end software application in accordance with an aspect of the present disclosure.
Figure 2B:
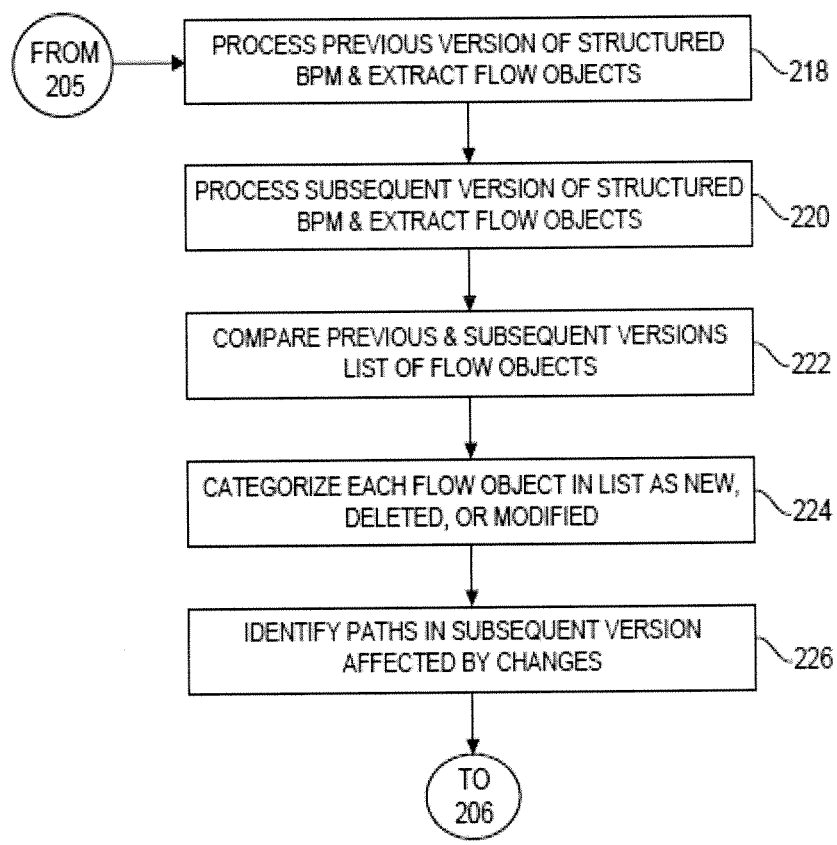
FIG. 2B illustrates a flowchart of a perform test case regression method in accordance with an aspect of the present disclosure.

FIGS. 2A-2B illustrate flowcharts of a method for generating test cases from business processes for an end-to-end software application in accordance with an aspect of the present disclosure. It should be noted that the steps shown in FIGS. 2A-2B are exemplary to the described process and may include additional/different steps.

In general, the testing module 122 is configured to build structured hierarchical business process models (BPMs) that represent the business requirements specifications of the end-to-end software application to be tested. Upon generating the BPMs, the testing module 122 validates the BPM structure and creates a functional flow layout which represents all possible execution sequences of activities as well as all possible states and transitions in the BPM structure. The testing module 122 utilizes the functional flow layout to identify a plurality of functional flow paths, in which each functional flow path represents a corresponding sequence of activities or tasks between the start and end elements in the functional flow layout. The testing module 122 generates one or more test case scenarios for each of the identified functional flow paths and executes the generated test case scenarios against the associated identified flow paths to analyze whether the result is satisfactory. The testing module 122 is configured to display the output results for each of the generated test case scenarios per flow path in a report for the user to view.

As shown in FIG. 2A, the process begins at which one or more requirements documents of the end-to-end software application are received at the computing device 102, 106 for handling by the testing module 122 (Block 200). In an aspect, the end-to-end software application is comprised of a collection of related business process activities and associated tasks that are implemented in the software. In an example aspect, the business process embodied in the software application may begin with customer requirements and may end with the fulfillment of the customer requirements.

In an aspect, the developer of the requirements documents can designate one or more activities to have a particular criticality associated with it, such high, medium and low. For example, if a particular activity is marked by the developer as having a high criticality, all the paths and therefore all test cases involving that activity are marked as having a high criticality. Similarly, an activity having a medium or low criticality will have corresponding paths and test cases with the corresponding criticality. As will be shown below, the criticality information is output by the testing module 122 along with its test case results in a reporting format (FIG. 5).

The business functional requirements of the end-to-end application are adequately represented in the structured business process models (BPM) that are generated by the testing module 122 (Block 202). The testing module 122 is configured to use various modeling techniques to generate a structured BPM that is in a graphical notation and represents details of the business requirements of the software application.

In an aspect, the functionality of each business functional requirement is specified in the form of one or more workflows or flow paths, in which a workflow is represented as a sequential set of activities performed by the end users. Further, these activities are elaborated step by step in task flow models. The structured BPM can be generated by the testing module 122 using business process modeling notation (BPMN), UML activity diagrams (UCADs) and the like. Details of how the testing module 122 generates the structured BPMs will now be described.

Figure 3A:
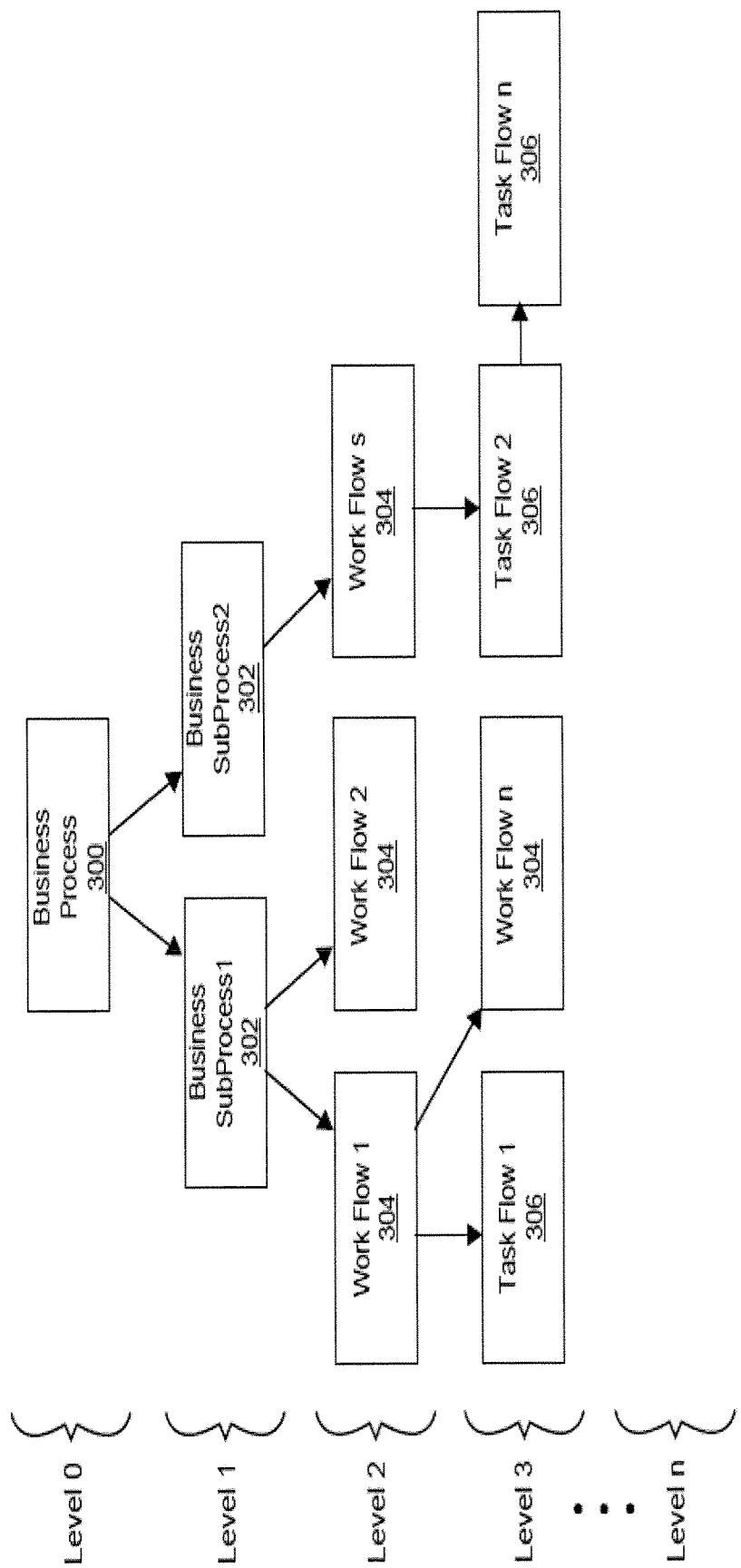
FIG. 3A illustrates a generalized structure of a business process model in accordance with an aspect of the present disclosure.

In particular, FIG. 3A illustrates a generalized structure of a business process model in accordance with an aspect of the present disclosure. It should be noted that the illustration in FIG. 3A is exemplary only and is not to be considered as limiting. As shown in FIG. 3A, the BPM can be represented at various levels starting from Level 0 to Level n, although FIG. 3A only shows Levels 0-3. In an aspect, Level 0 is the highest level and has one or more business processes 300 defined, whereby the business process(es) 300 represent the software application's functionalities at the highest level of abstraction. The business process 300 defined at Level 0 can be expanded at various levels based on its complexity.

As shown in FIG. 3A, the business process 300 may be designed to include one or more business sub-processes 302, shown at Level 1. Each business sub-process 302 may be further broken down into one or more activities or workflows 304 in Level 2 of the hierarchy (i.e. Workflow 1, Workflow 2 . . . Workflow 's'). In an aspect, a workflow can be defined as one or more designated activities that are to be performed to fulfill a business process or sub-process which it is associated with. A workflow may incorporate elements such as processes, activities, gateways, connectors and the like.

Referring to FIG. 3A, the business process structure may be designed such that one or more workflows 304 can be further broken down into one or more task flows 306 and/or other workflows 304 (Task Flow 1, Workflow n, Task Flow 2 . . . Task Flow n). A task flow 306 may include elements representative of detailed tasks which are to be performed, including, but not limited to, user input, system process, system output and the like. Each task flow 306 represents the dynamic use case behavior or functionality of the activity that the task flow 306 is defined to implement.

Figure 3B:
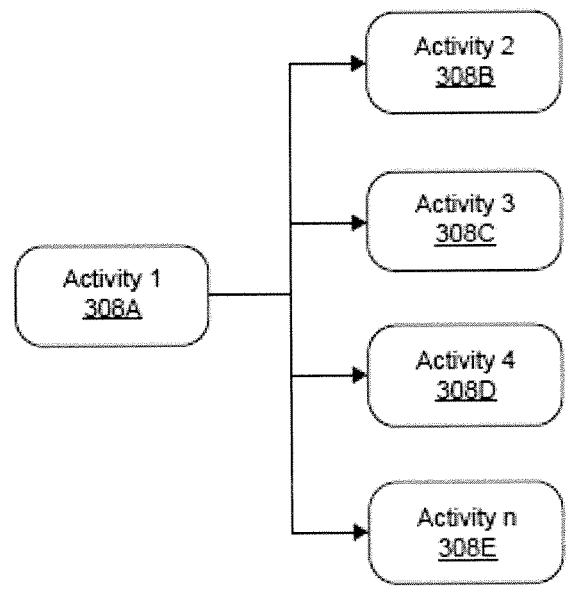
FIG. 3B illustrates a block diagram of a single workflow activity branching into multiple workflow activities in accordance with an aspect of the present disclosure.
Figure 3C:
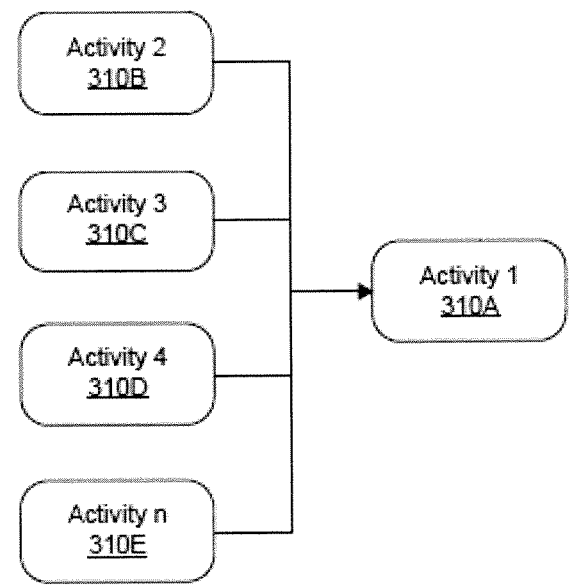
FIG. 3C illustrates a block diagram of multiple workflows being used by a single workflow in accordance with an aspect of the present disclosure.

In an aspect where a workflow activity is reusable and can be accessed by several workflows, a separate workflow diagram for such a reusable activity can be generated by the testing module 122 (FIGS. 3B and 3C). Thus, the reusable workflow can be linked by the testing module 122 to one or more other workflows that may reuse its functionality.

FIG. 3B illustrates a block diagram of a single workflow activity branching into multiple workflow activities in accordance with an aspect of the present disclosure. FIG. 3C illustrates a block diagram of multiple workflows being used by a single workflow in accordance with an aspect of the present disclosure. It should be noted that the illustrations in FIGS. 3B and 3C are exemplary only and are not to be considered as limiting.

For instance, as shown in FIG. 3B, a single caller activity 308A is making use of the functionality of a plurality of callee activities 308B-308E. After the functionality of each callee's activity 308B-308E is executed, the control of the execution reverts back to the caller activity 308A to complete execution of any remaining activities. It should be noted that the one or more of the activities 308A-308E shown in FIG. 3B may be work flows and/or task flows.

In another instance, as shown in FIG. 3C, a plurality of activities 310B-310E may access and execute the functionality of a single activity 310A. After the single activity 310A is executed, the control reverts to the corresponding caller activities 310B-310E. It should be noted that the one or more of the activities 310A-310E shown in FIG. 3C may be work flows and/or task flows.

When generating the structured BPM, the testing module 122 utilizes graphical elements including, but not limited to, Flow Objects; Connecting Objects; and Swim lanes, although other appropriate graphical elements are contemplated. In an aspect, Flow Objects can form the core elements of the business process structure. Some examples of Flow Objects include, but are not limited to, Events, Activities, and/or Gateways. In an aspect, Connecting Objects are used to connect Flow Objects and thus create the structure of the BPM. Swim lanes are utilized to organize activities into separate visual categories in order to illustrate different functional capabilities or responsibilities.

Although several various Connecting Objects are used in creating the structured BPM, the testing module 122 may utilize a Sequence Flow to show the order or sequence in which activities are to be performed in the BPM. As shown in the Figures, the Sequence Flow may be illustrated as a solid line with an arrowhead indicating the direction in which the activities are to be performed An Event Flow Object may represent a trigger used during the course of the execution of the activities. In an example, the Event Flow Object can be represented using a circle, although the Event Flow Object may be represented using a different graphical object. Depending on where it affects the flow, the Event Flow Object may be a Start Event, an Intermediate Event, or an End Event.

An Activity Flow Object represents work that is done and can be a Task flow activity, a Workflow activity and/or a Sub-Process activity. For instance, if the activity is part of a sub-process, it is represented as a Sub-Process object. In an aspect, the activity requirements can be further detailed using a task flow object 306. A Gateway Flow Object can be used to represent decisions and can indicate forking, merging, and/or joining of activities with respect to various objects.

Figure 3D:
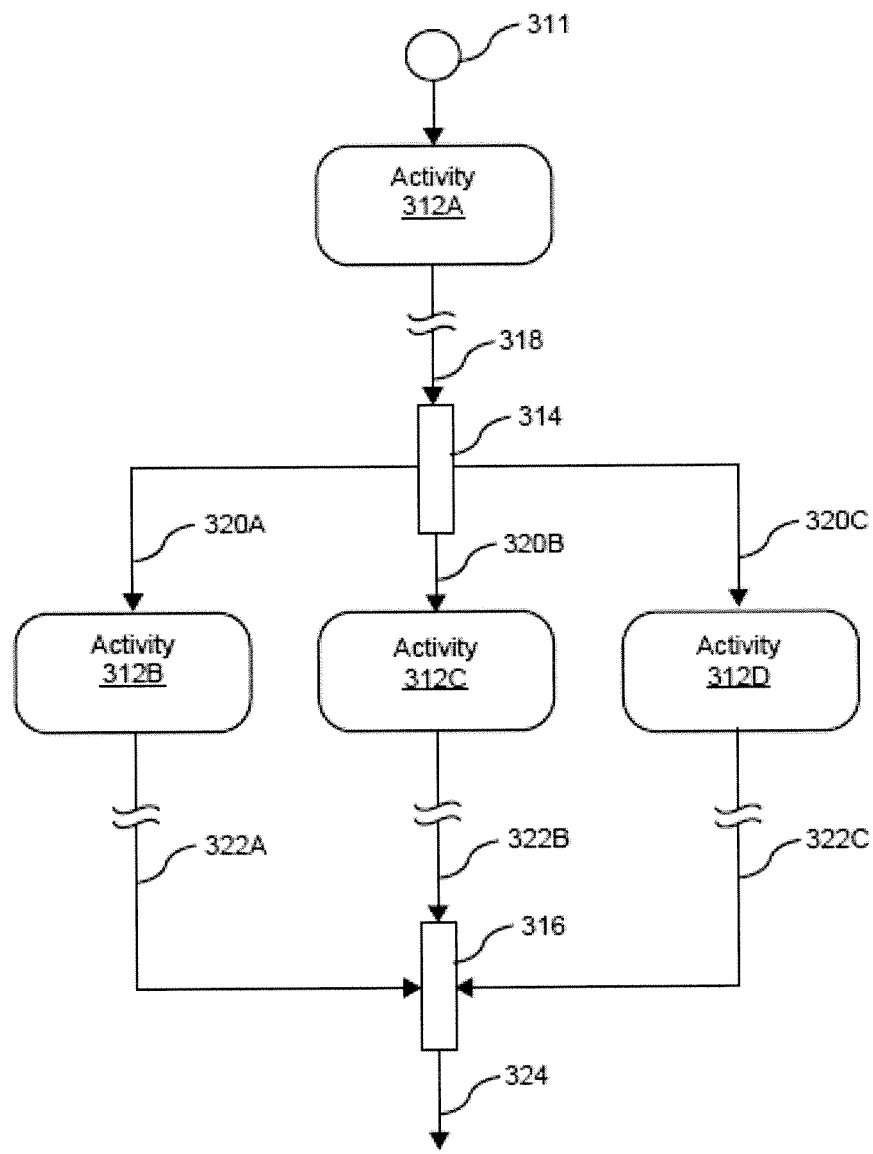
FIG. 3D illustrates an example structured business process model containing Fork and Join Gateways in accordance with an aspect of the present disclosure.
Figure 3E:
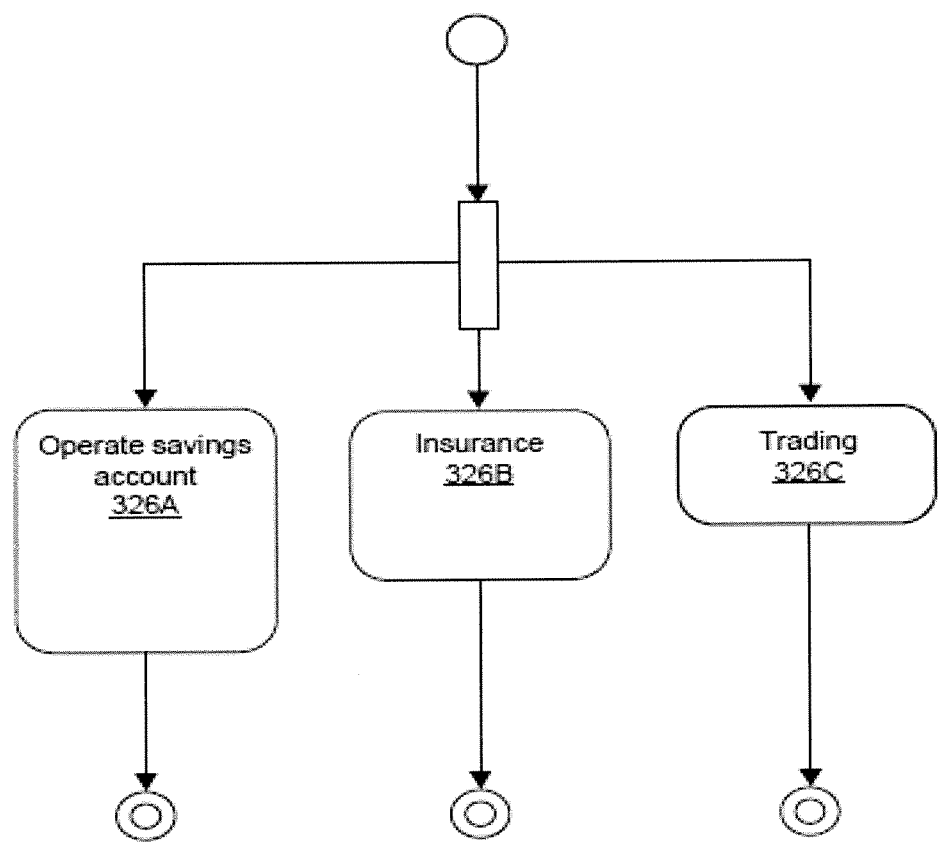
FIGS. 3E-3H illustrate the business process model structuring method performed by the testing module for an exemplary end-to-end software application in accordance with an aspect of the present disclosure.

FIG. 3D illustrates an example structured business process model containing Fork and Join Gateways in accordance with an aspect of the present disclosure. Considering that abstract business functionalities of the end-to-end applications include processes having a set of process flows, the testing module 122, in generating the structured BPMs, decomposes each process into sets of one or more sub-processes, work flow activities and/or task flows. These task-flows are constructed by the testing module 122 by identifying a set of user-system interactions involved in the corresponding activity. This is typically referred to as units of behavior, which are serve as a sequence of one or more user input(s), system process(es) & condition(s) and/or system output(s).

As shown in FIG. 3D, the model includes an Event Flow Object 311 (which may be a Start or Intermediate Event), an activity 312A, a Fork Gateway object 314, a plurality of activities 312B, 312C, 312D, and a Join Gateway object 316. Additionally, the structured BPM includes flows or paths 318, 320A-320C, 322A-322C and 324. It should be noted that the illustration in FIG. 3D is exemplary only and is not to be considered as limiting.

As shown in FIG. 3D, the Fork Gateway 314 splits the input path 318 from activity 312A into a plurality of parallel output paths 320A-320C that are input into parallel activities or tasks 312B-312D. In an aspect, the Fork Gateway 314 can be an AND node designed to take the input path 318 and split it into N output paths 320A, 320B and 320C, whereby each output path 320A-320C serve as an input path into corresponding parallel activities 312B-312D. Similarly, the Join Gateway 316 can be an AND node designed to take paths 322A-322C output from activities 312B-312D and join them into the output path 324.

In the scenario that the structured BPM does not include a Join Gateway 316, activities 312B-312D are not considered as parallel activities but instead represent choices which are executed one after the other. Hence, the number of paths 322A-322C output from activities 312B-312D do not converge and represent the number of choices listed after the Fork Gateway 314.

FIGS. 3E-3H illustrate the business process model structuring method performed by the testing module for an exemplary end-to-end software application in accordance with an aspect of the present disclosure. In particular to an example internet banking application shown in FIG. 3E, the testing module 122 may consider functionalities such as operating savings account 326A, insurance 326B, and trading 326C at the highest level of abstraction. In structuring the BPM for the functionalities illustrated in FIG. 3E, the testing module 122 converts each functionality stated in the requirement documents into a set of one or more workflow activities.

Figure 3F:
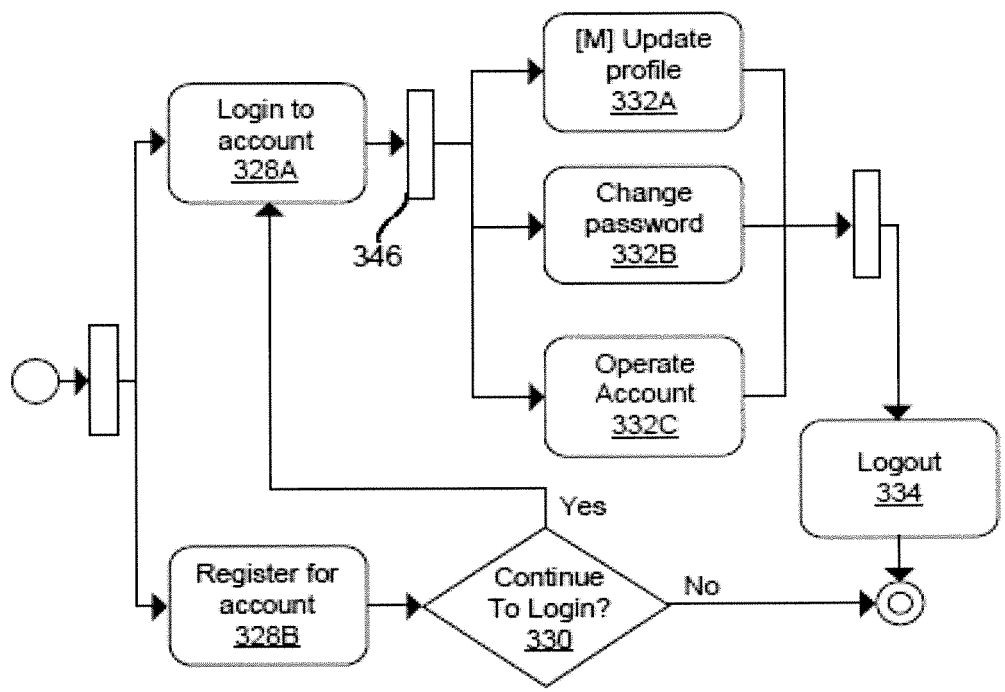
Figure 3G:
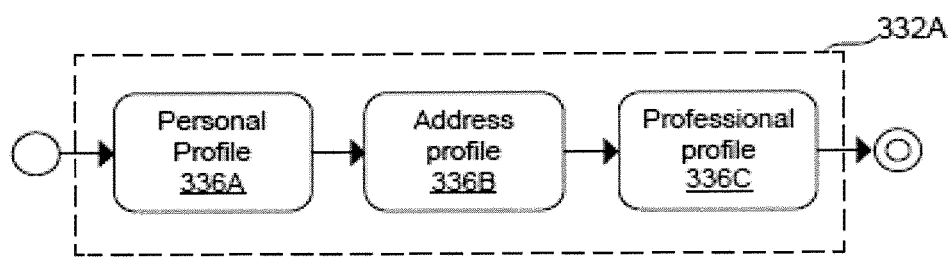

As shown in the example in FIG. 3F, the testing module 122 models the functionalities into workflow activities or flow paths such as login to account 328A, register for account 328B, continue to login 330, update profile 332A, change password 332B, operate account 332C, logout 334, etc.

Referring back to FIG. 3D, the testing module 122 may specify that an activity element (e.g. 312A) in a workflow has one or more sub-processes (e.g. one or more of 312B-312D). As stated above, the testing module 122 may convert or decompose the one or more sub-processes into a set of sub-process workflows or flow paths. The testing module 122 can represent a link from the sub-process element to the decomposed sub-process workflows. For instance in the example shown in FIGS. 3F and 3G, the testing module 122 may link the update profile activity 332A (FIG. 3F) to have a personal profile activity 336A, address profile activity 336B and a professional profile 336C.

Figure 3H:
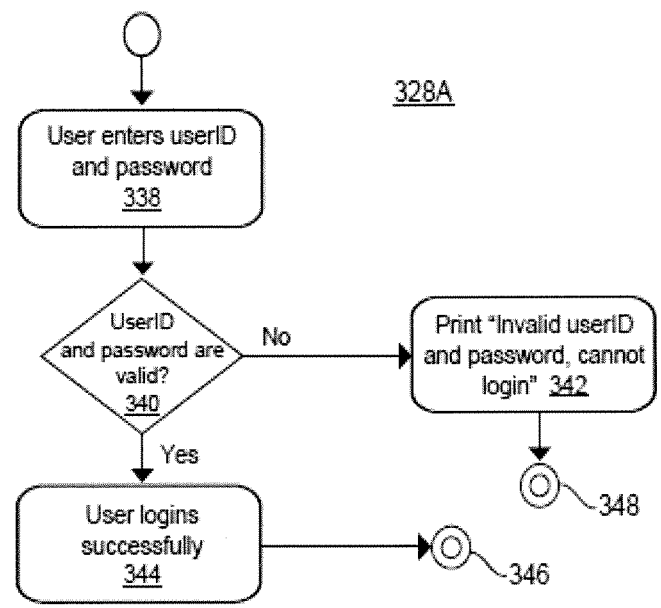

FIG. 3H illustrates an example task flow diagram in accordance with an aspect of the present disclosure. As shown in FIG. 3H, the testing module 122 is configured to further convert or decompose functional behavior of one or more specific activities in the workflow into a set of one or more task-flows.

Referring back to the example, FIG. 3H illustrates the structured BPM that the testing module 122 may generate for the 'Login to Account' activity 328A (FIG. 3F). In particular, the testing module 122 will generate a flow object 338 for receiving the user's userID and password. As shown in the example in FIG. 3H, the testing module 122 will identify and model task flows off of the "Login to Account" flow object 328A shown in FIG. 3F. One possible interaction will be that the user successfully enters valid userID and password and is thus able to successfully access the system. The other possible interaction will be that the user unsuccessfully enters an invalid userID and/or password combination into the system. The testing module 122 then structures the BPM such that a conditional element determines the validity of the userID and password 340. The testing module 122 generates a flow object 344 if the userID and password are correct. If the conditional element is followed by a 'yes' or true branch 344, the system output element will show a successful login message, whereby the End Event Object 346 refers the activity flow back to object 346 in FIG. 3F. The testing module 122 also generates a flow object 342 if the userID and/or password is incorrect. This interaction shares the input element and conditional element with the first interaction and then has a 'no' or false branch 340 leading to output element showing login failed message 342. It should be noted that the structured BPM in FIG. 3H is exemplary and can be applied to other activities like 'Update profile', 'Change password' etc and the like in a similar way.

It is contemplated that one or more specific functionalities may be used in multiple processes and activities in the end-to-end software application. For example, the "Login to Account" functionality 328A (FIG. 3F) may be used by a number of other activities in the end-to-end software application. In such an aspect, the testing module 122 may be configured to reuse these functionalities to avoid generating repeated/redundant activities in the structured BPM. In particular, the testing module 122 may be configured to automatically identify and model reusable functionalities based on one or more generalization relationships.

Figure 3I:
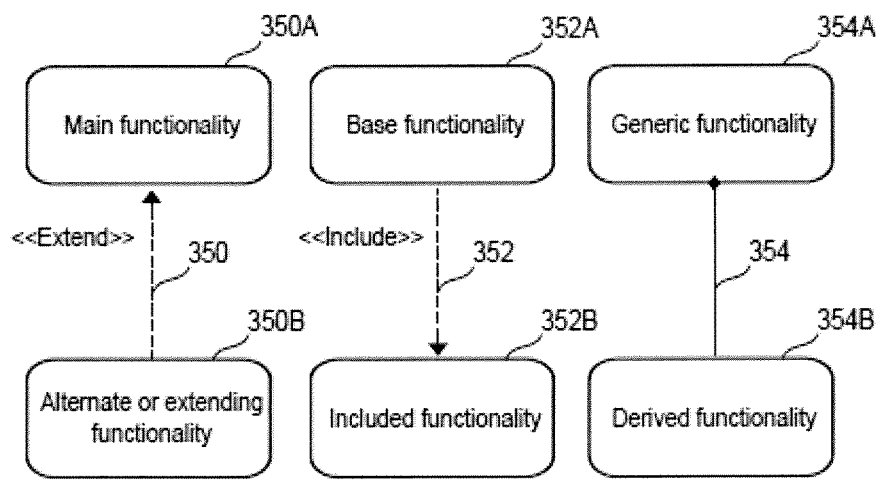
FIG. 3I illustrates a block diagram representing reusable functionalities among structured BPMs in accordance with an aspect of the present disclosure.

FIG. 3I illustrates a block diagram representing reusable functionalities among structured BPMs in accordance with an aspect of the present disclosure. As shown in FIG. 3I, one type of reusable functionality is an Extend dependency 350 which is shown between Main functionality 350A and Alternate or Extending functionality 350B, wherein the Extend Dependency represents that functionality 350B is an alternate behavior of the Main functionality 350A.

Another type of relationship is an Include dependency 352 which invokes one functionality into functionality. As shown in FIG. 3I, the Include dependency 352 indicates the inclusion of the included functionality 352B into the Base functionality 352A.

Another type of relationship is an Inheritance 354 which is used to derive a more specialized functionality (i.e. Derived functionality 354B) off of a Generic functionality 354A. In an aspect, the Derived functionality 354B retains most of the behavior of the Generic functionality 354A and adds additional behavior. An example explaining these relations are described in relation to FIG. 3J.

Figure 3J:
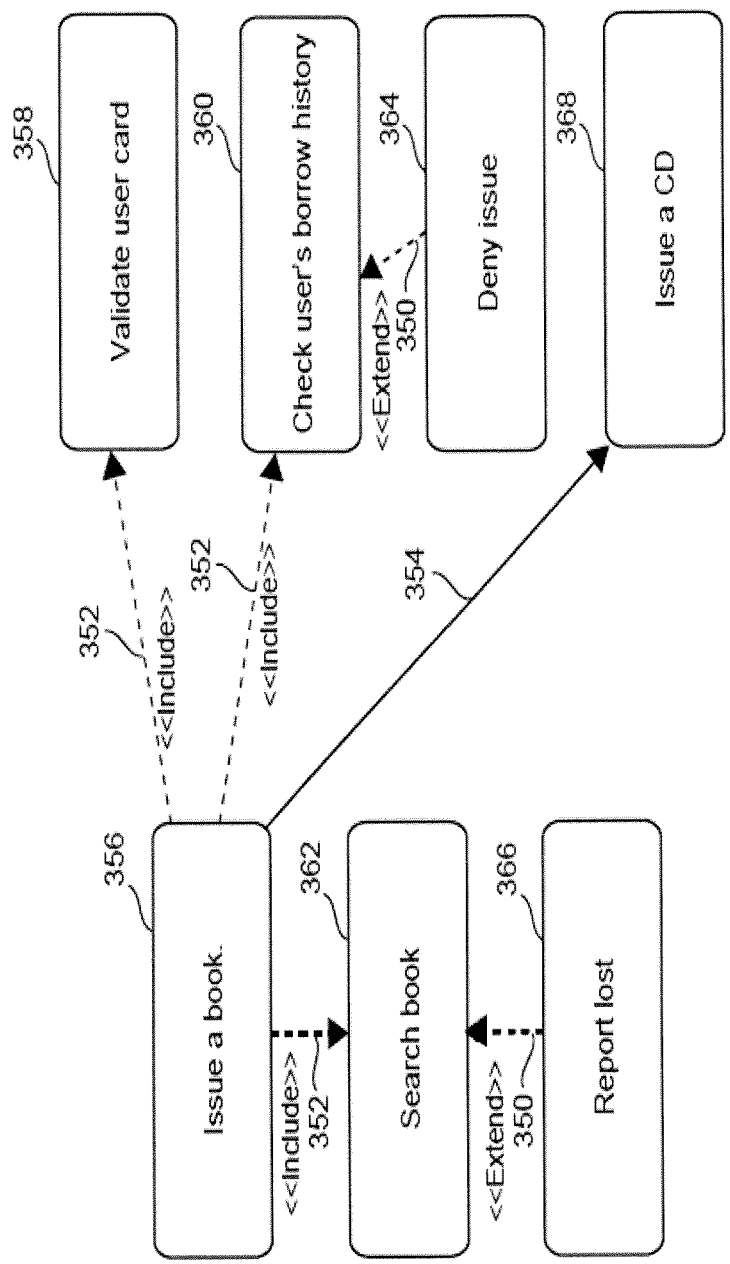
FIG. 3J illustrates an example block diagram representing reusable functionalities among structured BPMs in accordance with an aspect of the present disclosure.

FIG. 3J illustrates an example block diagram representing reusable functionalities among structured BPMs in accordance with an aspect of the present disclosure. As shown in FIG. 3J, for the activity 'Issue a book' 356, several other functionalities may apply, such 'Validate user card' 358, 'Check users borrow history' 360, or 'Search book' 362. As shown in FIG. 3J, the Include functionality 352 is linked between the "Issue a book" 356 activity and activities 358, 360 and 362. The testing module 122 may utilize be different types of reusable relationships among these functionalities. For example, the testing module 122 may apply the Extend dependency 350 between 'Check user's borrow history' 360 and the 'Deny issue book' activity 364 if the user has not returned previously issued books. Similarly, the testing module 122 may apply the Extend dependency 350 between the 'Search book' activity 362 and the 'Report lost activity 366 in case of missing inventory. The testing module 122 may apply the Inheritance 354 between the 'Issue a CD' functionality 368 and the 'Issue a book' functionality 356.

Referring back to FIG. 2A, once the structured BPMs for the end-to-end software application are generated, the testing module 122 processes and verifies the generated BPMs for structural correctness. Accordingly, the testing module 122 accomplishes this by first analyzing or parsing the structured BPM file (and/or sub-files) to generate a node structure representative of the structured BPM (Block 204). In an aspect, the testing module 122 extracts these elements by analyzing the software code of the structured BPM, which may be exported XMI files (using any UML modeling tools) or other appropriate files. In parsing the structured BPM, the testing module 122 identifies all of the objects in the structured BPM, in which the objects are Flow Objects, Gateway Objects, Event Objects, Swim lanes, links, Connection Objects, reusability relationships, criticality information and other known objects along with the control flows and paths which represent all of the Business processes, Sub-processes, Activities (i.e. work flows, task flows).

In an aspect, the testing module 122 creates a node structure in which the node structure includes a plurality of nodes, wherein each identified object in the structured BPM is mapped to a corresponding node in the node structure and has a unique identifying key. In an aspect, the testing module 122 is able to properly map each object with a corresponding node by utilizing attribute information of the nodes. In other words, each node may be comprised of attributes such as, but not limited to, node type, node id (UID format), node description, list of target nodes linked to it, links to task flows or workflows, associated swim lanes and the like. In an aspect where the testing module 122 determines that a particular element is linked to another model, the testing module 122 may correspondingly link a node for a particular object to another appropriate identified object. Once all of the objects for each identified model are mapped, the testing module 122 analyzes the relationships among the various models to identify a root model in the node structure.

In an aspect, the testing module 122 determines whether the structured BPM is an updated version of a prior structured BPM generated by the testing module 122 (Block 205). If so, the testing module 122 performs a test case regression technique as described below in relation to FIG. 2B.

In contrast, if the testing module 122 determines that the structured BPM is the only version, the testing module 122 analyzes the generated node structure for the BPM and evaluates it with respect to a set of one or more validation or testing rules for consistency and correctness (Block 206). In an aspect, validation rules can be pre-established or may be created/modified by an administrator to be customized for a particular software application.

In an example aspect, some validation rules may be for the testing module 122 to ensure that an element does not have more than one hyperlink; check whether all paths end with an END node; check whether there are any cyclic loops in the functional flow graph; and check whether there is link from a lower level model to a higher level model (e.g. no link from a task flow model to a workflow model).

In an aspect, with respect to the validation rules, the testing module 122 may check whether there are any parallel paths in the node structure. In an aspect, if the testing module 122 finds parallel paths, it will check whether all of the paths from a Fork Object converge at one or more Join Object. In an aspect, the testing module 122 may check whether the structuring principle of 1 to N and N to 1 paths are followed for Conditional Objects as well as AND Objects, where N=>2. In an aspect, the AND Object may be used as both a Fork Object and a Join Object. If the testing module 122 determines that the AND Object is used as Fork and Join Objects, the testing module 122 will confirm that the paths adhere to the 1 to N and N to 1 (where N=>2) path rules. It should be noted that other appropriate validation rules may be considered by the testing module 122 and the above validation rules are not to be taken as limiting.

Upon performing the validation process, if the testing module 122 identifies at least a portion of the node structure violates at least one validation rule, as in Block 208, the testing module 122 identifies those invalid portions and notifies the user (Block 210). The process then returns to Block 200.

In contrast, at Block 208, if the testing module 122 determines that the node structure is valid, the testing module 122 constructs a functional flow layout representative of the node structure of the BPM (Block 212). In an aspect, the functional flow layout may be in the form of a graph such that the functional flow layout is referred to as a Functional Flow Graph (FFG). It should be noted that the functional flow layout may be generated in other textual and/or graphical representations.

In the example where the functional flow layout is a FFG, the FFG is a graphical data structure representative of the functional flow of activities of the structured BPM. In an aspect, a root node in the FFG is considered as the main node. Accordingly, all identified sequences of activities which branch out from the root node to their respective final elements are generated by the testing module 122 as also being part of the FFG. It is also contemplated that all possible states and transitions in the sequence of activities are generated by the testing module 122 as also being part of the FFG. In an aspect, the testing module 122 utilizes an associative array data structure to represent the individual models in the node structure along with appropriate links between models. The associative array data structure is a collection of key-ID value pairs in which a key correlates to a particular unique ID value which identifies a particular model in the structured BPM. In other words, the testing module 122 is able to effectively identify a particular model by using the key which correlates to the corresponding ID value of that particular model. This is advantageous when generating the FFG, because the testing module 122 can easily link a model, e.g. Model A, to another model, e.g. Model B, by simply providing the key corresponding to Model B in the link. In an aspect, the keys are stored in the node-link FFG. Appendix A illustrates example code of the above explained process.

Once the FFG is created, the testing module 122 generates test scenarios for each flow path identified from the FFG (Block 214). In identifying the flow paths, the testing module, in an aspect, parses the FFG to extract independent functional flow paths. In an aspect, the testing module 122 achieves this by performing a depth first search on the FFG. The testing module 122 is thus able to extract and store functional flow paths and the information about their respective process flows, work flows and task-flows. Appendix B illustrates example code of the above explained process.

Figure 4A:
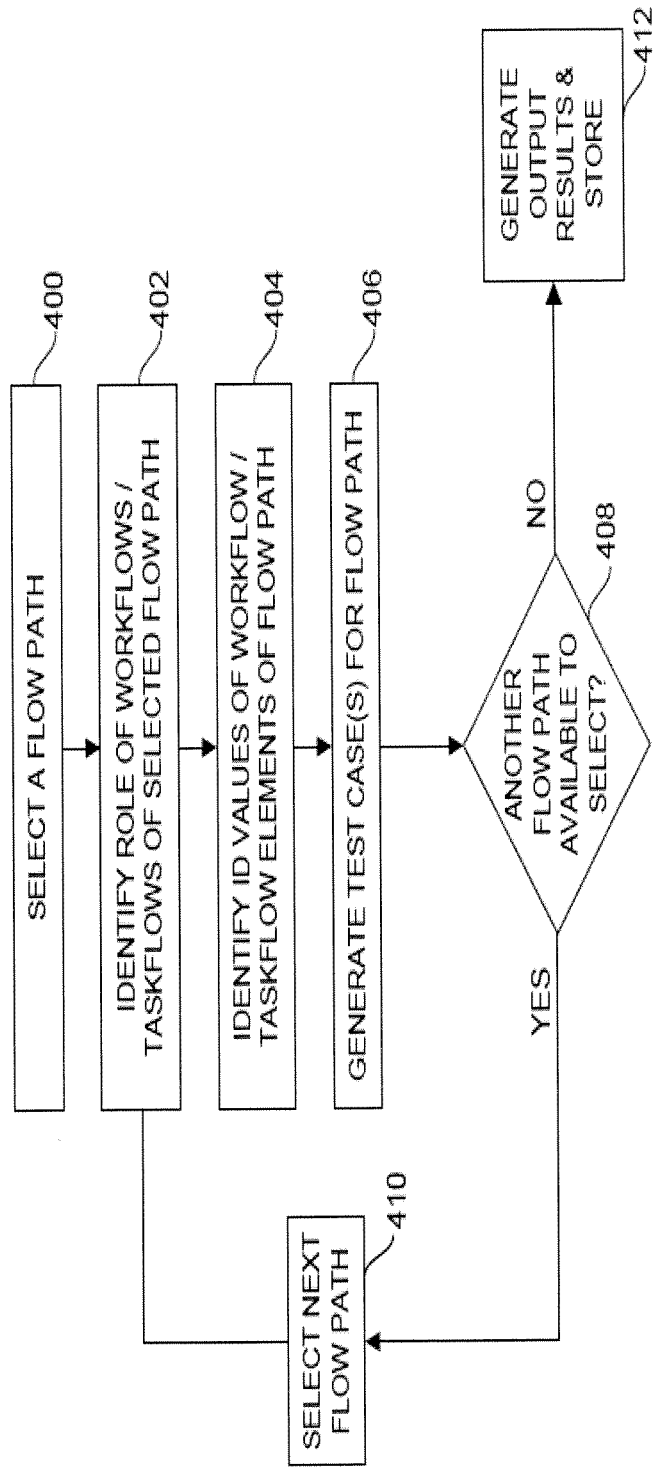
FIGS. 4A-4B illustrates a flow diagram of a test case generation process in accordance with an aspect of the present disclosure.

Once the flow paths are identified, the testing module 122 performs a technique on the flow paths to generate test cases which can be used to test the software application. FIG. 4A illustrates a flow diagram of a test case generation process in accordance with an aspect of the present disclosure. In an aspect shown in FIG. 4, the testing module 122, when performing the test case generation process, selects a first functional flow path (Block 400).

For the selected functional flow path, the testing module 122 identifies the role(s) performed by the workflow(s) and associated decomposed task-flows for the selected flow path (Block 402). In an aspect, the testing module 122 analyzes the names of the swim lanes in the selected functional flow path to determine the roles performed by the elements in the flow path. By determining the role(s) in the selected flow path, the testing module 122 is able to effectively generate appropriate test cases for that flow path.

In an example scenario where the testing module 122 determines that the FFG includes parallel paths split from an AND Gateway Object, the testing module 122 may consider those parallel paths as a single path. This allows the testing module 122 to determine that the parallel activities should be under observation for the execution of generated test cases. In an aspect, the testing module 122 considers each identified functional flow path as a single test scenario, whereby all units of behavior in the extracted functional flow path (sequences of inputs, system tasks, and outputs) forms a test step.

Thereafter, the testing module 122 determines the designated ID of the parent workflow of the selected functional flow path by using the assigned key-ID described above (Block 404). Upon obtaining the ID of the parent workflow, the testing module 122 is able to identify any sub-process workflows which may be linked to the parent workflow.

Once all workflows associated with the selected functional flow path are identified, the testing module 122 is able to analyze the workflows and construct or generate one or more appropriate test cases for the selected flow path (Block 406). Details of how the testing module 122 generates the test cases are described in relation to FIG. 4B.

The above process is repeated for every functional flow path that is available for the testing module to select (Blocks 408 and 410). If no flow paths are available to test, the testing module 122 thereafter generates an output in a user-defined or pre-established format (Block 412). In an aspect, the testing module 122 displays a report on a display screen and/or in hardcopy format. An example output report generated by the testing module 122 is shown in FIG. 5.

Figure 4B:
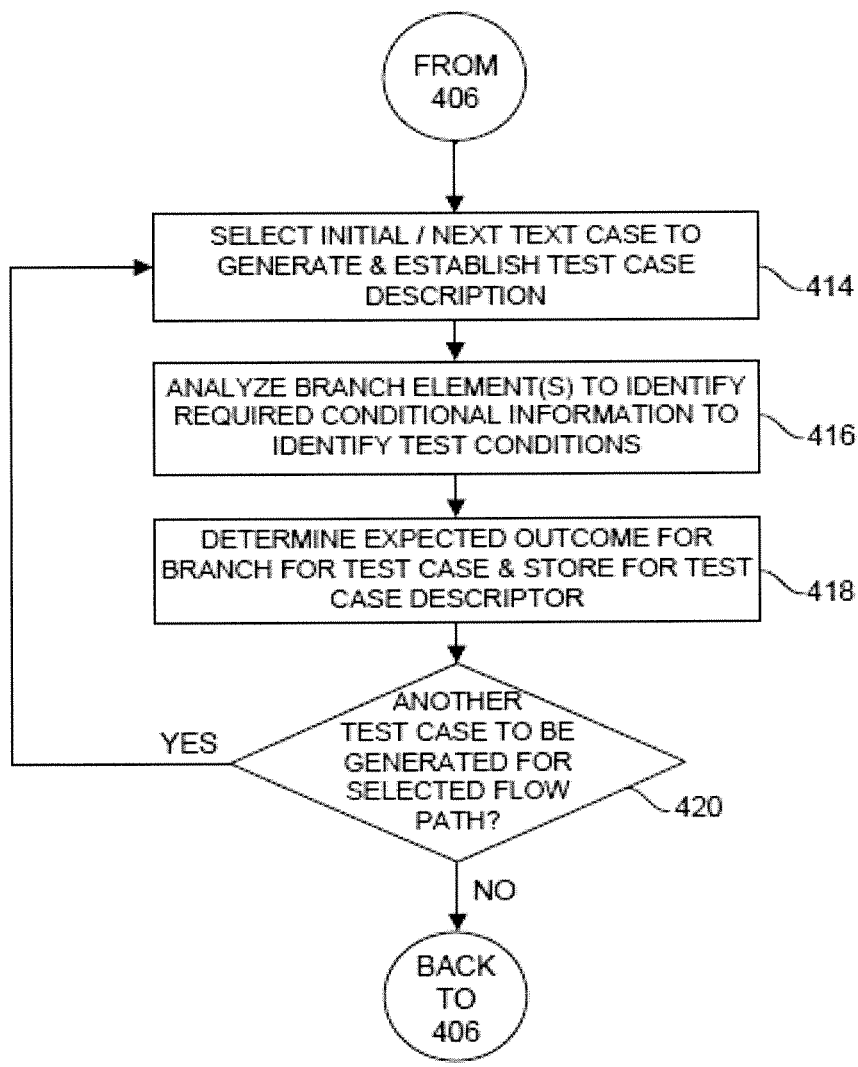

Referring now to FIG. 4B, FIG. 4B illustrates a flow diagram of generating test cases for selected functional flow paths from FIG. 4A in accordance with an aspect of the present disclosure. As stated above, each functional flow path in the FFG contains a defined user-system interaction structure, such as a user-input element followed by a branch element which precedes a system-output element. One example is shown in FIG. 3H.

As shown in FIG. 4B, for the selected flow path in Block 406 of FIG. 4A, the testing module 122 generates a test step description for each user-input element (Block 414). This is done by using the element's content as the user-input element present in the selected functional flow path describes the task to be performed by the user.

The testing module 122 then determines the expected output for any system-output elements in the functional flow path and generates the expected output for the generated test case (Block 418). In an aspect, the testing module 122 assumes that the system-output element will specify the system's behavior if the outcome of system condition matches its branch label. One example is that the testing module 122 assumes that the system's behavior will be a 'Yes' if the outcome of the system condition is a 'True'. In another example, the testing module 122 assumes that the system's behavior will be a 'No' if the outcome of the system condition is 'False'.

As shown in FIG. 4B, the testing module 122 iteratively repeats this process for each generated test case for the selected functional flow path. In particular, the testing module 122 will determine whether another test case for the selected flow path exists (Block 420). If so, the process repeats to Block 414. Otherwise, the process reverts back to Block 406 in FIG. 4A.

As referred to Block 205 above in FIG. 2A, it is possible that the requirements documents processed by the testing module 122 may be an updated version of a previous version. It is contemplated that new enhancements and fault correction in software result in respective changes being made and submitted in the later version of the requirement specifications. In an aspect, the testing module 122 may receive subsequent requirements information for the end-to-end software application, whereby the subsequent received information may include changes made to the software specifications. In this aspect, the present system and method utilizes a regression test selection that identifies changes made to software specifications and their impact on the software being validated. Based on the impact the testing module 122 will identify the portions and recommend test cases to be re-executed to validate the software being modified. The approach also generates new test cases including modified test cases to validate the changed software.

FIG. 2B illustrates a flow chart representative of regression test method performed by the testing module in accordance with an aspect of the present disclosure. In an aspect, the testing module 122 obtains and processes a previous version of the structured BPM (Block 218). Additionally, the testing module 122 obtains and processes a subsequent, new version of the structured BPMs (Block 220).

The testing module 122 thereafter compares the extracted list of flow objects for the new BPM with the extracted list of flow objects for previous BPM using a comparison algorithm (Block 222) to identify the variations. In an aspect, the flow objects are compared from their respective lists of previous and subsequent BPM using their designated IDs.

Once the testing module 122 identifies which flow objects have been changed between the compared structured BPMs. The testing module 122 will categorize each flow object to one of three groups based on the type of change that the flow object had undergone (Block 224).

Such categories are new object, deleted object or an updated object. In particular, if the testing module 122 identifies an object that is present in the subsequent BPM and which was not present in the previous BPM, the testing module 122 considers the flow object is a new object. In an aspect, if the testing module 122 identifies an object that is present in the previous BPM and which is not present in the subsequent BPM, the testing module 122 considers the flow object is a deleted object. In particular to an aspect, if the testing module 122 identifies an object that is present in both BPMs which have the same ID, the testing module 122 compares the content of both flow objects. If there is a content mismatch, the testing module 122 designates the flow object as a modified object.

After the testing module 122 categorizes each of the altered flow objects in their respective buckets, the testing module 122 identifies the paths in the new modeling diagram that are affected by the changes (Block 226).

In an example aspect, the testing module 122 is able to determine this by constructing a functional flow layout or graph of the subsequent structured BPM, in a manner similar to the discussion above. In this example, the testing module 122 then extracts functional flow paths from the functional flow layout or graph (FFG), as described above (in relation to Algorithm A). For each extracted path, the testing module 122 determines if that particular flow path contains any of the flow objects that were categorized in Block 224. If the testing module 122 determines that the particular flow path does contain at least one flow object categorized in Block 224, the testing module 122 designates that flow path as affected.

For all flow paths that are determined to have flow objects that have been changed, those flow paths have functionalities that have been affected. Accordingly, the testing module 122 revalidates each of those identified flow paths in accordance with the processes described above. In particular, for the testing module 122 to validate the changed portions of the system, the test cases belonging to affected functional flow paths are re-generated and re-executed by the testing module 122.

As specified above, an example output of the testing module 122 is shown in FIG. 5. As shown in FIG. 5, the testing module 122 displays a table 500 having several columns and rows. Some exemplary columns include, but are not limited to, role 502, workflow path number 504, activity 506, test case number 508, criticality 510, test step 512, test step description 514, conditions 516 and expected output 518. Regarding criticality, the requirements specification may indicate that certain flow paths have a higher or lower critical value than other flow paths. In the output generated, the testing module 122 displays the corresponding criticality to the associated flow path. In an aspect, the testing module 122 groups paths with high criticality together along with medium and low criticality grouped together in a specified order. In an aspect the list may be sorted on the basis of criticality and ordered from most to least critical test cases. The entire list can be stored into a user specified format such as spread-sheet, XML and HTML etc.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

APPENDIX A

Creating the Functional Flow Graph.

```
Read all the models in a given format
    Create control flow graph
    {
        Create NodeMap of models with model name as a key
        (NodeMap.NameModel)
        For (each model)
        {
            For (all elements in the model)
            {
                Extract element information such as UID,
                    description, node type, target
                    nodes, etc and Frame it as a node
                If (node has a link to another model)
                    Store the model name as a node
                    Link_attribute
            }
            Add to NodeMap
        }
    // Identify the root model among models in the NodeMap
```

APPENDIX A-continued

Creating the Functional Flow Graph.

Identify root model
}

APPENDIX B

Generating Paths

```
// Paths generator
1.   DFS(NodeMap->ModelName)
2.   WHILE the model has node n
     2.1. CurrentNode ← n
     2.2. Initialize PATH
     2.3. NextNode ← GetNext of CurrentNode
     2.4. IF CurrentNode has TaskFlowLink
          2.4.1. Call DFS (model)
          2.4.2. End IF
          2.4.3. If CurrentNode has HyperLink
          2.4.4. Call DFS(CurrentNode.HyperLinkName)
          2.4.5. Append Nodes to PATH
          2.4.6. End IF
          2.4.7.
     2.5. IF sizeof NextNode is 1 //If NextNode has 1 target
          2.5.1. Add NextNode to PATH
          2.5.2. CurrentNode ← NextNode
     2.6. ELSE IF sizeof NextNode is 2
          2.6.1. For size of NextNode
          2.6.2. Push PATH to PATHSTACK
          2.6.3. Push NextNode to EDGESTACK
          2.6.4. End FOR
          2.6.5. EDGESTACK is not EMPTY
               2.6.5.1. NextNode ← POP from EDGESTACK
               2.6.5.2. PATH ← POP from PATHSTACK
               2.6.5.3. Add NextNode to PATH
               2.6.5.4. CurrentNode ← NextNode
               2.6.5.5. End IF
     2.7. ELSE IF sizeof NextNode is 0
```

APPENDIX B-continued

Generating Paths

```
          2.7.1. Add PATH to PATHLIST
          2.7.2. IF EDGESTACK is not EMPTY
          2.7.3. Repeat step 2.6.5
          2.7.4. End IF
     2.8. End IF
3.   End WHILE
4.   RETURN PATHLIST
```

APPENDIX C

Generate Test cases from Paths

```
1.   Initialise workFlowNumer to 1
2.   While (paths are not empty)
3.     path = getPath(Paths)
4.     Display (workFlowNumer ++) under workflow number column
5.     Display(criticality ← Path.getCriticality)
6.     While (No more Nodes in Path)
7.       Display Node.description
8.       If Node.type == Activity OR Node.type == Subprocess then
9.         Display Node.swimlane as Under Role column
10.    If(Node.taskflowLink)
11.    {
12.      Initialize TestCaseNumber = 1;
13.      Task_paths = get_Taskpaths (Node.taskflowLink)
14.      While (Task_paths are not empty)
15.      Get Task Path from Task_paths
16.      Display (TestCaseNumber ++)
17.      Display(criticality Task_paths.getCriticality)
18.        While (No more Nodes in Task_paths)
19.        Display Node.descriptions for each of the unit of behavior along
           with test step number
20.      }
21.      End while
22.    End while
```

APPENDIX D

Regression Test Selector:

```
1.   Parse the old model and get all the nodes and store them in oldNodeList using Al-
     gorithm 1
2.   Parse the new model and Store all Nodes in newNodeList using Algorithm 1
3.   Identify added, deleted, modified nodes
        //identify Added Bucket containing all newly added nodes
        // newNode is a node in newNodeList
     3.1 while(no more nodes to traverse in newNodeList)
     3.2 {
     3.3    newNode = getNextNode(newNodeList)
     3.4    If !(oldNodeList.contains (newNode) //Node UID comparisons
     3.5    Add newNode to AddedList
     3.6 }
        //Identify Deleted Bucket that contains all deleted nodes in new model
        //old node is a node in oldNodeList
     3.7 While (no more nodes to traverse in oldNodeList)
     3.8 {
     3.9    oldNode =getNextNode(oldNodeList)
     3.10   If !(newNodeList.contains (oldNode) //Node UID comparisons
     3.11   Add oldNode to DeletedList
        //Updated bucket
     3.12   While (no more nodes to traverse in oldNodeList)
     3.13   {
     3.14      oldNode = getNextNode(oldNodeList)
     3.15      While (no more nodes to traverse in newNodeList)
     3.16      {
     3.17      newNode = getNextNode(newNodeList)
     3.18      If (newNode.UID == oldNode.UID) AND newNode.Desc != old-
           Node.Desc)
     3.19      Add newNode to UpdatedList
     3.20      }
     3.21   }
     3.22   oldPaths:= Generate Path for oldModel // using Algorithm 2
     3.23   newPaths:= Generate Path for newModel // using Algorithm 2
```

APPENDIX D-continued

Regression Test Selector:

```
//Checking for affected paths after Path generation
    4.  Identify affected paths(oldPaths, newPaths)
        // identify all paths in newPaths that contain added and modified nodes
        4.1  while (no more paths in newPaths)
        4.2  {
        4.3     newPath = getNextPath (newPaths)
        4.4     While(no more nodes in newPath)
        4.5     {
        4.6        Node = getNewNode(newPath)
        4.7        If(AddedList.contains (Node) OR UpdatedList.contains(Node)
        4.8     Set newPath as Affected Path.
        4.9
        4.10
               // identify all paths that contain deleted nodes
        4.11    For oldPath in OldPaths AND newPath in NewPaths
        4.12    If(DeletedList.contains(oldPath.Node)
        4.13    Set Path as Affected Path.
               // identify if linked task flows are changed and appropriately mar those paths as
               changed
        4.14    If(Node.contains(taskflowLink))
        4.15    Oldpath = oldTaskFlowPaths.getPath(Node.UUID);
        4.16    Newpath = newTaskFlowPaths.getPath(Node.UUID);
        4.17
        4.18      Call affectedPaths(Oldpath, Newpath);
        4.19    }
        4.20  }
    5.  Format test cases from affected paths // call Algorithm from Appendix C
```

What is claimed is:

1. A method for testing an end-to-end software application having a plurality of functionalities, the method comprising:

generating, by an application testing computing device, a structured business process model (BPM) file representative of a set of business requirements for an end-to-end software application to be tested, the structured BPM file including a plurality of flow objects and linking objects, and wherein the generating further comprises mapping each of one or more identified elements from the generated structured BPM file to a corresponding location in a node structure utilizing at least attribute information associated with each of the one or more identified elements, wherein a unique ID-key value is assigned to each of the one or more identified elements that maps the identified element with its corresponding location in the node structure;

validating, by the application testing computing device, the generated structured BPM file in association with one or more validation rules;

generating, by the application testing computing device, a graphical representation of data in the validated structured BPM file, wherein the graphical representation comprises a functional flow layout representative of a node structure embodying all possible scenarios to be handled by the software application in the validated structured BPM file;

identifying, by the application testing computing device, a plurality of data paths from the generated functional flow layout in the graphical representation, wherein each of the plurality of data paths are associated with one or more corresponding scenarios of the possible scenarios;

generating, by the application testing computing device, one or more test cases associated with the functioning of the end-to-end software application for each identified plurality of data paths based on a role performed by the identified data paths and an associated decomposed task-flow for the set of business requirements for the end-to-end software application, wherein each of the generated one or more test cases comprises a test step description describing a task required to be performed;

applying, by the application testing computing device, the one or more generated test cases to a corresponding data path in the end-to-end software application;

comparing, by the application testing computing device, an actual outcome from the data path of the software application to an expected outcome for the data path; and generating, by the application testing computing device, a report including at least the actual outcome and the expected outcome, wherein the generated report is displayable on a computing device screen.

2. The method of claim 1, further comprising storing by the application testing computing device, information associated with at least the generated structured BPM file in a memory, wherein the stored information is mapped to an established test case profile for the end-to-end software application being tested.

3. The method of claim 1, wherein generating the structured BPM file further comprises:

parsing by the application testing computing device, the generated structured BPM file to identify all of the one or more elements included in the structured BPM file;

creating by the application testing computing device, a node structure including a plurality of nodes; and determining by the application testing computing device, one or more relationships between the one or more identified elements with respect to the node structure.

4. The method of claim 1, wherein the generating of one or more test cases further comprises:

identifying by the application testing computing device, a role of a selected data path of the structured BPM file;

identifying by the application testing computing device, test conditions for the selected data path by analyzing branch elements to recognize required conditional information for user input for the data path; and determining by the application testing computing device, for each generated test case for the selected data path, an expected outcome for each branch element based on the user input and storing the expected outcome for a test case profile in a memory.

5. The method of claim 1, further comprising performing a test case regression technique prior to the validation step, the method including:

determining by the application testing computing device, if the structured BPM file is an updated version of a previous version of a structured BPM file;

extracting by the application testing computing device, flow objects from the updated version of the structured BPM file and comparing the extracted flow objects with corresponding flow objects in the previous version;

identifying by the application testing computing device, one or more flow objects in the updated version that have changed with respect to the previous version; and identifying by the application testing computing device, affected flow paths of the changed flow objects in the updated version, wherein the changed flow objects and identified affected flow paths are to be validated in the validation step.

6. The method of claim 1, wherein at least one possible scenario further comprises a sequence of executable activities to be performed by the software application.

7. The method of claim 1, wherein at least one possible scenario further comprises one or more states and transitions associated with a sequence of executable activities to be performed by the software application.

8. The method as set forth in claim 1, wherein the generated graphical representation of data in the validated structured BPM file is a hierarchical structure.

9. A non-transitory machine readable medium having stored thereon instructions for testing an end-to-end software application having a plurality of functionalities, comprising machine executable code which when executed by at least one processor of a computing device, causes the processor to:

generate a structured business process model (BPM) file representative of a set of business requirements for an end-to-end software application to be tested, the structured BPM file including a plurality of flow objects and linking objects, and wherein the generating further comprises map each of one or more identified elements from the generated structured BPM file to a corresponding location in a node structure utilizing at least attribute information associated with each of the one or more identified elements, wherein a unique ID-key value is assigned to each of the one or more identified elements that maps the identified element with its corresponding location in the node structure;

validate the generated structured BPM file in association with one or more validation rules;

generate a graphical representation of data in the validated structured BPM file, wherein the graphical representation comprises a functional flow layout representative of a node structure embodying all possible scenarios to be handled by the software application in the validated structured BPM file;

identify a plurality of data paths from the generated functional flow layout in the graphical representation, wherein each of the plurality of data paths are associated with one or more corresponding scenarios of the possible scenarios;

generate one or more test cases associated with the functioning of the end-to-end software application for each identified plurality of data paths based on a role performed by the identified data paths and an associated decomposed task-flow for the set of business requirements for the end-to-end software application, wherein each of the generated one or more test cases comprises a test step description describing a task required to be performed;

apply the one or more generated test cases to a corresponding data path in the end-to-end software application;

compare an actual outcome from the data path of the software application to an expected outcome for the data path; and generate a report including at least the actual outcome and the expected outcome, wherein the generated report is displayable on a computing device screen.

10. The readable medium of claim 9, wherein the processor is further configured to store information associated with at least the generated structured BPM file in a memory, wherein the stored information is mapped to an established test case profile for the end-to-end software application being tested.

11. The readable medium of claim 9, wherein the processor, when generating the structured BPM, is further configured to:

parse the generated structured BPM file to identify all of the one or more elements included in the structured BPM file;

create a node structure including a plurality of nodes; and determine one or more relationships between the one or more identified elements with respect to the node structure.

12. The readable medium of claim 9, wherein the processor, when generating the one or more test cases, is further configured to:

identify a role of a selected data path of the structured BPM file;

identify test conditions for the selected data path by analyzing branch elements to recognize required conditional information for the data path; and determine, for each generated test case for the selected data path, an expected outcome for each branch element and store the expected outcome for a test case profile in a memory.

13. The readable medium of claim 9, wherein the processor is further configured to perform a test case regression technique prior to the validation, the processor further configured to:

determine if the structured BPM file is an updated version of a previous version of a structured BPM file;

extract flow objects from the updated version of the structured BPM file and compare the extracted flow objects with corresponding flow objects in the previous version;

identify one or more flow objects in the updated version that have changed with respect to the previous version; and identify affected flow paths of the changed flow objects in the updated version, wherein the changed flow objects and identified affected flow paths are to be validated.

14. The readable medium of claim 9, wherein at least one possible scenario further comprises a sequence of executable activities to be performed by the software application.

15. The readable medium of claim 9, wherein at least one possible scenario further comprises one or more states and transitions associated with a sequence of executable activities to be performed by the software application.

16. The medium as set forth in claim 9, wherein the generated graphical representation of data in the validated structured BPM file is a hierarchical structure.

17. An application testing computing device comprising:
a memory having stored thereon code embodying machine executable programmable instructions; and
a processor configured to execute the stored programmable instructions in the memory, which when executed by the processor, causes the processor to:
generate a structured business process model (BPM) file representative of a set of business requirements for an end-to-end software application to be tested, the structured BPM file including a plurality of flow objects and linking objects, and wherein the generating further comprises map each of one or more identified elements from the generated structured BPM file to a corresponding location in a node structure utilizing at least attribute information associated with each of the one or more identified elements, wherein a unique ID-key value is assigned to each of the one or more identified elements that maps the identified element with its corresponding location in the node structure;
validate the generated structured BPM file in association with one or more validation rules;
generate a graphical representation of data in the validated structured BPM file, wherein the graphical representation comprises a functional flow layout representative of a node structure embodying all possible scenarios to be handled by the software application in the validated structured BPM file;
identify a plurality of data paths from the generated functional flow layout in the graphical representation, wherein each of the plurality of data paths are associated with one or more corresponding scenarios of the possible scenarios;
generate one or more test cases associated with the functioning of the end-to-end software application for each identified plurality of data paths based on a role performed by the identified data paths and an associated decomposed task-flow for the set of business requirements for the end-to-end software application, wherein each of the generated one or more test cases comprises a test step description describing a task required to be performed;
apply the one or more generated test cases to a corresponding data path in the end-to-end software application;
compare an actual outcome from the data path of the software application to an expected outcome for the data path; and
generate a report including at least the actual outcome and the expected outcome, wherein the generated report is displayable on a computing device screen.

18. The computing device of claim 17, wherein the processor is further configured to store information associated with at least the generated structured BPM file in a memory, wherein the stored information is mapped to an established test case profile for the end-to-end software application being tested.

19. The computing device of claim 17, wherein the processor, when generating the structured BPM file, is further configured to:
parse the generated structured BPM file to identify all of the one or more elements included in the structured BPM file;
create a node structure including a plurality of nodes; and
determine one or more relationships between the one or more identified elements with respect to the node structure.

20. The computing device of claim 17, wherein the processor, when generating the one or more test cases, is further configured to:
identify a role of a selected data path of the structured BPM file;
identify test conditions for the selected data path by analyzing branch elements to recognize required conditional information for the data path; and
determine, for each generated test case for the selected flow path, an expected outcome for each branch element and store the expected outcome for a test case profile in a memory.

21. The computing device of claim 17, wherein the processor is further configured to perform a test case regression technique prior to the validation, the processor further configured to:
determine if the structured BPM file is an updated version of a previous version of a structured BPM file;
extract flow objects from the updated version of the structured BPM file and compare the extracted flow objects with corresponding flow objects in the previous version;
identify one or more flow objects in the updated version that have changed with respect to the previous version; and
identify affected flow paths of the changed flow objects in the updated version, wherein the changed flow objects and identified affected flow paths are to be validated.

22. The computing device of claim 17, wherein at least one possible scenario further comprises a sequence of executable activities to be performed by the software application.

23. The computing device of claim 17, wherein at least one possible scenario further comprises one or more states and transitions associated with a sequence of executable activities to be performed by the software application.

24. The device as set forth in claim 17, wherein the generated graphical representation of data in the validated structured BPM file is a hierarchical structure.

* * * * *